H. DALWIGK.
WHEEL TIRE.
APPLICATION FILED AUG. 31, 1918.
1,315,471. Patented Sept. 9, 1919.
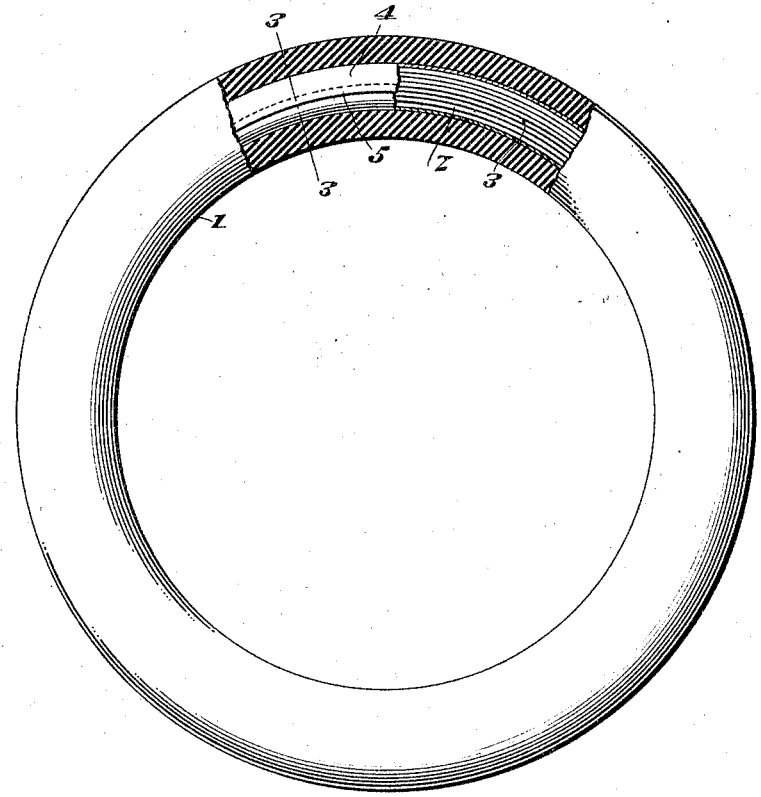
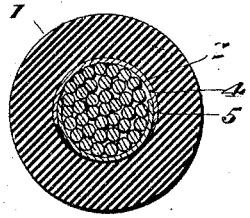
Inventor
Hermann Dalwigk
By Victor J. Evans
Attorney
Witnesses

UNITED STATES PATENT OFFICE.

HERMANN DALWIGK, OF SAN ANTONIO, TEXAS.

WHEEL-TIRE.

1,315,471. Specification of Letters Patent. Patented Sept. 9, 1919.

Application filed August 31, 1918. Serial No. 252,173.

*To all whom it may concern:*

Be it known that I, HERMANN DALWIGK, a citizen of the United States, residing at San Antonio, in the county of Bexar and State of Texas, have invented new and useful Improvements in Wheel-Tires, of which the following is a specification.

This invention relates to improvements in wheel tires, especially resilient tires for use on automobile wheels, the object of the invention being to provide an improved tire which is made of solid rubber or other suitable elastic material and which embodies a spring which is embedded in the tire and comprises a series of convolutions, and also embodies an elastic casing for the spring which protects the spring from direct contact with the rubber of the tire, the said casing comprising two members having lapping edges which render the casing extremely elastic so that the casing does not interfere with the action of the spring.

With the above and other objects in view, the invention consists in the construction, combination and arrangement of the device herein described and claimed.

In the accompanying drawing:—

Figure 1 is a side elevation, partly in section, of a tire construction and arranged in accordance with my invention.

Fig. 2 is a horizontal sectional view of the same.

Fig. 3 is a transverse sectional view of the same on the plane indicated by the line 3—3 of Fig. 1.

In accordance with my invention, the tire 1 is made of solid rubber or other suitable elastic material. In the center of the tire is embedded a spring 2 which spring is made of steel or other suitable spring wire of suitable gage and which is arranged in a coil, the spring consisting of a single coil wire, the convolutions of the coil being arranged substantially in contact with one another and the ends 3 of the wire being free. The coil spring has its convolutions extending circumferentially of the tire.

The spring is covered by a substantially tubular casing 4 which, in practice, is preferably made of sheet aluminum. The casing preferably comprises two members or sections having their edges lapping as illustrated in Figs. 1 and 3 of the drawings. This construction renders the casing elastic so that the same accommodates itself under all conditions to the action of the spring. The spring serves to greatly strengthen the tire and to increase the resilience and shock absorbing properties thereof.

The aluminum casing prevents the rubber of the tire from coming in direct contact with the spring. In making the tire, the inner portion of the rubber is first molded in a mold, the spring with its casing is then arranged in place in the rubber tire and the outer portion of the rubber tire is then molded so that the rubber tire is solid and integral and the spring with its casing is embedded in the center thereof.

Having thus described my invention, I claim:—

In a tire for vehicle wheels an outer member of elastic material having a circumferential bore therethrough, a coil spring in the bore having its convolutions extending circumferentially therethrough and its ends contacting and each convolution thereof arranged concentric with the tread and rim side of the tire, and a casing inclosing the spring and received in the bore of the first mentioned member, said casing comprising two sections having lapping edges, and the said casing preventing the spring from direct contact with the first mentioned member.

In testimony whereof I affix my signature.

HERMANN DALWIGK.